United States Patent
Sonu

(10) Patent No.: US 6,404,829 B1
(45) Date of Patent: Jun. 11, 2002

(54) DC INSENSITIVE AGC CIRCUIT FOR OPTICAL PRML READ CHANNEL

(75) Inventor: Gene Sonu, San Jose, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/343,113

(22) Filed: Jun. 29, 1999

(51) Int. Cl.[7] ............................ H04L 27/04; G11B 5/09
(52) U.S. Cl. ................................. 375/345; 375/341
(58) Field of Search ................................. 375/341, 345, 375/262, 298; 341/118, 139; 369/47, 48, 49; 360/46

(56) References Cited

U.S. PATENT DOCUMENTS

| | | | |
|---|---|---|---|
| 5,768,320 A | * 6/1998 | Kovacs et al. | 375/341 |
| 5,838,738 A | * 11/1998 | Zook | 375/340 |
| 5,862,005 A | * 1/1999 | Leis et al. | 360/27 |
| 5,886,842 A | * 3/1999 | Ziperovich | 360/51 |
| 6,003,051 A | * 12/1999 | Okazaki | 708/3 |
| 6,252,733 B1 | * 6/2001 | Staszewski | 360/51 |
| 6,332,205 B1 | * 12/2001 | Conway | 714/746 |
| 6,337,889 B1 | * 1/2002 | Mita et al. | 375/341 |

* cited by examiner

Primary Examiner—Chi Pham
Assistant Examiner—Dung X. Nguyen
(74) Attorney, Agent, or Firm—Pennie & Edmonds LLP

(57) ABSTRACT

AGC Circuitry for an optical PRML read channel that is insensitive to low frequency disturbances of an RF input signal. The AGC Circuitry includes a VGA amplifier, a low pass filter, an ADC, a baseline Wander Correction Circuit, a digital gain control circuit, and a DAC. The VGA amplifier amplifies the RF input signal to produce a second RF signal. The low pass filter filters the second RF signal to produce a first analog signal. The ADC converts the first analog signal into a digital AGC output signal suitable for decoding. The baseline Wander Correction Circuit removes from the digital AGC output signal effects of low frequency disturbance of the RF input signal to produce a second digital signal. The digital gain control circuit controls the gain of the VGA amplifier by producing a digital gain control signal in response to the second digital signal. The DAC for converting the digital gain control signal into the analog gain control signal to be applied to the VGA amplifier, the analog gain control signal being substantially free from effects of low frequency disturbance of the RF input signal.

14 Claims, 6 Drawing Sheets

US 6,404,829 B1

DC INSENSITIVE AGC CIRCUIT FOR OPTICAL PRML READ CHANNEL

The present invention relates generally to automatic gain control (AGC) circuitry for a DVD Player, and particularly to AGC circuitry for an Optical PRML Read Channel of a DVD Player.

BACKGROUND OF THE INVENTION

A DVD player plays back information stored on a DVD. DVD, an acronym for Digital Video Disc or Digital Versatile Disc, is a relatively new type of Compact-Disc Read-Only-Memory (CD-ROM). With a minimum capacity of approximately 4.7 gigabytes, a DVD can store a full length movie. A DVD player includes an Optical Pick-up Unit (OPU), a Read channel, and a digital video decoder. The OPU converts information read from the DVD into an analog RF signal. The Read Channel takes this RF signal and generates a digital data signal and a synchronous clock signal. The Read Channel couples these signals to the digital video decoder, which decodes the data and converts it into a video format compatible with a TV.

Previously, DVD Read Channels were implemented with analog technology. Analog implementation allows a Read Channel to remove the large DC component that typically forms part of the RF input signal from the OPU with relative ease and minor effect upon the data and clock signals. Unchecked, the low frequency disturbance of the RF input signal can cause the amplitude of the output signal to exceed the expected peak-to-peak amplitude, which can negatively impact the performance of the digital video decoder. Additionally, the baseline wandering resulting from low frequency disturbances of the RF input signal can cause so much clock jitter that the Read Channel phase lock loop (PLL) used to generate the clock may lose lock.

Various considerations now push toward a digital implementation of DVD Read Channels and, in particular, toward Partial Response Maximum Likelihood (PRML) Read Channels. Digital implementation requires a new approach to removing the low frequency disturbances of the RF input signal to the RF channel so that clock jitter does not cause the PLL to lose lock and so that the amplitude of the data signal conforms to a target spectrum.

SUMMARY OF THE INVENTION

The present invention is AGC Circuitry for an optical Partial Response Maximum Likelihood (PRML) read channel that is insensitive to low frequency disturbances of an RF input signal. The AGC Circuitry includes a Voltage Gain Amplifier (VGA), a low pass filter, an Analog-to-Digital Converter (ADC), a baseline Wander Correction Circuit, a digital gain control circuit, and a Digital-to-Analog Converter (DAC). The VGA amplifier amplifies the RF input signal to produce a second RF signal. The low pass filter filters the second RF signal to produce a first analog signal. The ADC converts the first analog signal into a digital AGC output signal suitable for decoding. The baseline Wander Correction Circuit removes from the digital AGC output signal effects of low frequency disturbance of the RF input signal to produce a second digital signal. The digital gain control circuit controls the gain of the VGA amplifier by producing a digital gain control signal in response to the second digital signal. The DAC for converting the digital gain control signal into the analog gain control signal to be applied to the VGA amplifier, the analog gain control signal being substantially free from effects of low frequency disturbance of the RF input signal.

BRIEF DESCRIPTION OF THE DRAWINGS

Additional objects and features of the invention will be more readily apparent from the following detailed description and appended claims when taken in conjunction with the drawings, in which:

DESCRIPTION OF THE INVENTION

Figure 1:
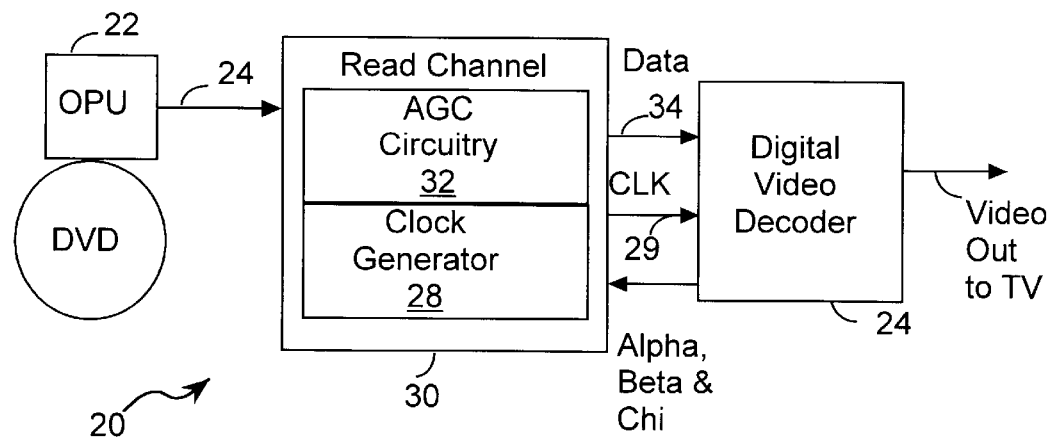
FIG. 1 illustrates, in block diagram form, a DVD player 20 including the AGC Circuitry of the present invention.

FIG. 1 illustrates, in block diagram form, DVD player 20, which includes OPU 22, Read Channel 30 and Digital Video Decoder 24. Read Channel 30 includes the Automatic Gain Control (AGC) Circuitry 32 of the present invention and a Clock Generator. AGC Circuitry 32 takes the RF input signal from OPU 22 on line 24 and generates a gain controlled, digital, Partial Response Maximum Likelihood (PRML) signal, the Data signal of line 34. Even though implemented with digital technology, AGC Circuitry 32 manages to minimize the negative impact of low frequency disturbances of the RF input signal on the Data Signal on line 34. AGC Circuitry 32 achieves this feat using Baseline Wander Correction Circuitry 48, which will be discussed in detail with respect to FIGS. 2–6.

A. The AGC Circuitry

Figure 2:
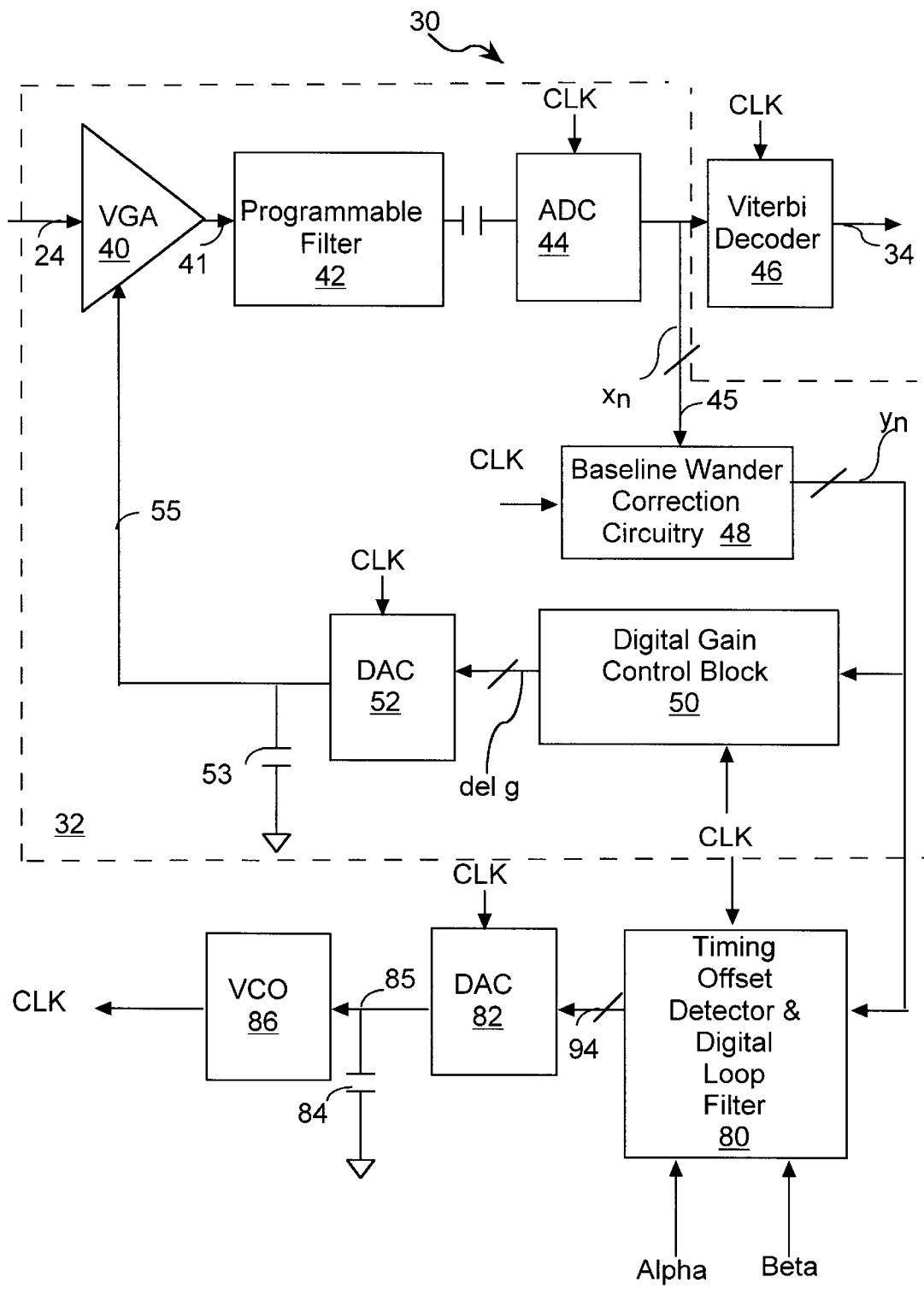
FIG. 2 illustrates, in block diagram form, the interrelationship between the AGC Circuitry and the Clock Generator of the DVD Read Channel.

FIG. 2 illustrates, in block diagram form, the interrelationship between the AGC Circuitry 32 and Clock Generator 28 of Read Channel 30. AGC Circuitry 32 shares with the Clock Generator Voltage Controlled Gain Amplifier (VGA) 40, Programmable Filter 42, Analog-to-Digital Converter (ADC) 44 and Baseline Wander Correction Circuitry 48. Additionally, Read Channel 30 includes Viterbi Decoder 46, Digital Gain Control Block 50, and Digital-to-Analog Converter (DAC) 52. The remaining circuits illustrated in FIG. 2 are particular to Clock Generator 28: Timing Offset Detector 80, DAC 82 and Voltage Controlled Oscillator (VCO) 86. The Clock Generator will be discussed following the discussion of AGC Circuitry 32.

VGA Amplifier 40 amplifies the RF input signal on line 24 by an amount controlled by a Gain Control Signal on line 55. The amplified RF signal on line 41 is then coupled to Programmable Filter 42. Programable Filter 42 is a high order, low-pass filter. Preferably, the 3 dB cut-off frequency of Programmable filter is on the order of 1/(3T), where T represents the sampling interval of the CLK signal. In one embodiment, Programmable Filter 42 also boosts the amplitude of the amplified RF signal by approximately 6 dB. The gain of Programmable Filter 42 is programmable to allow adjustment for differing input signal characteristics from various OPU brands.

Figure 3A:
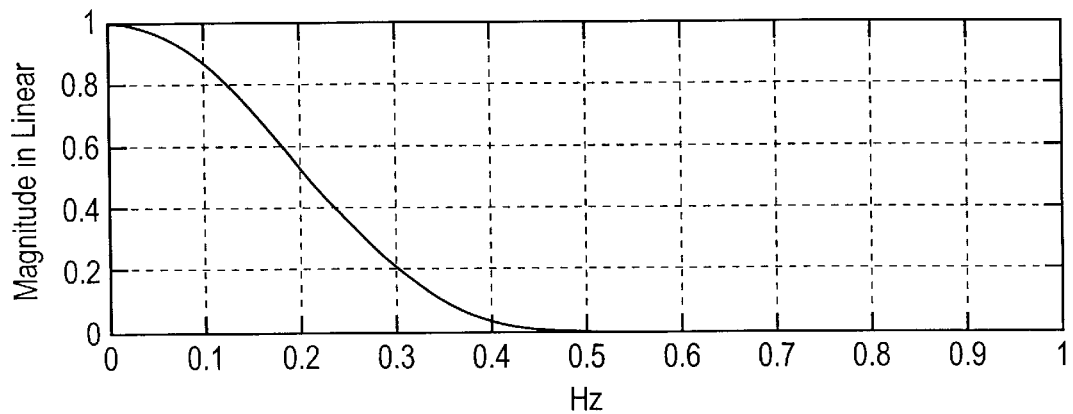
FIG. 3A illustrates the amplitude characteristic of the desired target input spectrum of $x_n$ for the Viterbi Decoder of the Read Channel, normalized for a channel bit period of one second.
Figure 3B:
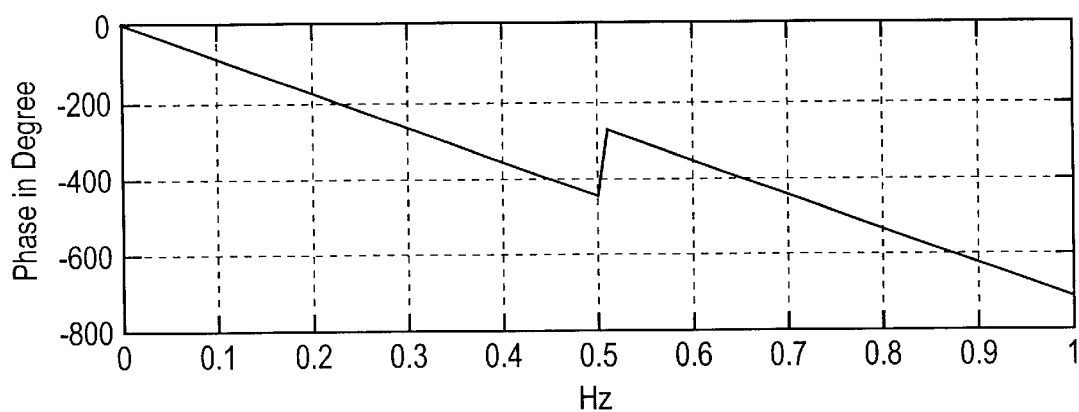
FIG. 3B illustrates the phase characteristic of the desired target input spectrum of $x_n$ for the Viterbi Decoder of the Read Channel, normalized for a channel bit period of one second.

The filtered and amplified RF signal output by Programable Filter 42 is then capacitively coupled to ADC 44. ADC 44 converts the analog RF signal into a digital signal, $x_n$, on line 45. In certain embodiments, the $x_n$ signal includes 5 or 6 bits. The $x_n$ signal is consistent with the target spectrum necessary to the normal operation of Viterbi decoder 34. FIGS. 3A and 3B illustrate the amplitude and phase characteristics, respectively, of the desired target spectrum of $x_n$, normalized for a channel bit period of one second. As a result of this normalization the Nyquist frequency is 0.5 where the magnitude is null. The 3T/3T read back frequency is 1/6T. Note that FIG. 3B displays a linear relationship between phase and frequency. Referring again to FIG. 2, the $x_n$ signal on line 45 is input to Viterbi Decoder 46, which takes the $x_n$ signal and generates the gain controlled Data Signal on line 34 using PRML decoding.

Figure 4:
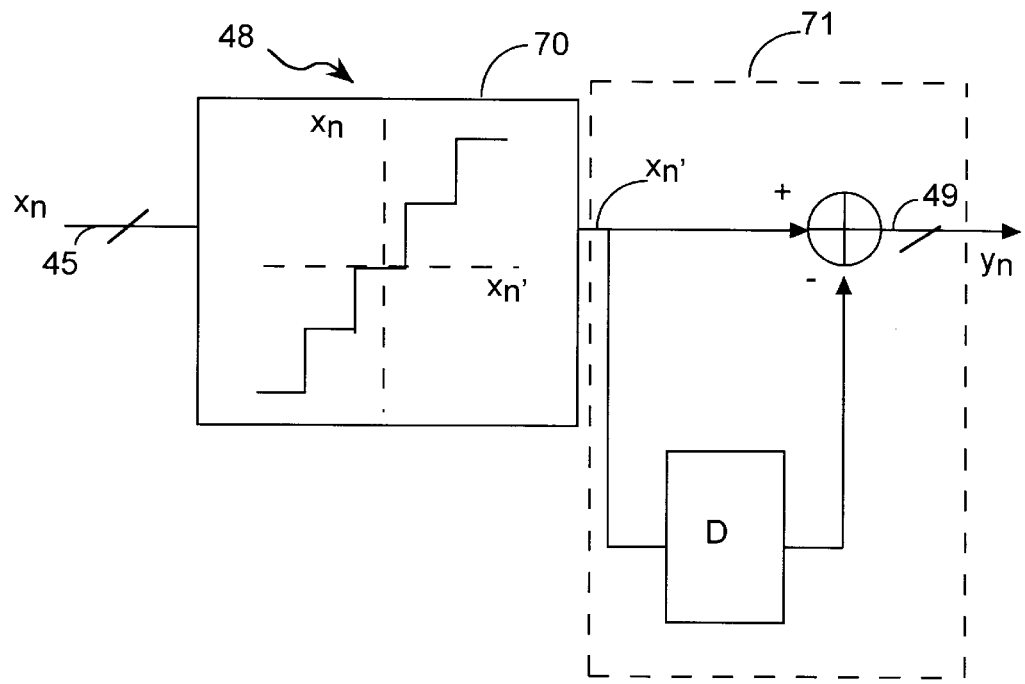
FIG. 4 illustrates a signal flow diagram for the Baseline Wander Correction Circuitry of the AGC Circuitry of the present invention.

The $x_n$ signal on line 45 is also coupled to Baseline Wander Correction Circuitry 48. Baseline Wander Correction Circuitry 48 significantly reduces DC components in the feedback loop used to generate the gain control signal on line 55, used to control VGA Amplifier 40. Consequently, the signal input to Viterbi Decoder 46 is much more likely to conform to the target spectrum necessary to its normal operation. FIG. 4 illustrates a signal flow diagram for Baseline Wander Correction Circuitry 48, which includes Quantizer 70 and Correction Circuit 71. Quantizer 70 significantly reduces the noise of its input signal $x_n$ as compared to its output signal, $x_n'$, thereby improving the reliability of Clock Generator 28. Quantizer 70 generates the $x_n'$ signal from the $x_n$ signal on line 47 according to the following relationship:

$$x_n' = q * \text{round}(x_n/q); \quad (1)$$

where q represents a quantization interval; and
"round" represents a rounding function.

The output signal, $y_n$, from Correction Circuit 71 can be expressed by the time based relationship:

$$y_n' = x_n' - x_{n-1}'. \quad (2)$$

In the frequency domain, Baseline Wander Correction Circuitry 48 has a transfer function of:

$$H(\omega) = 1 - D; \quad (3)$$

where D represents the delay associated with a single sample interval T. Replacing D with $e^{-j\omega t}$ the transfer function becomes:

$$H(\omega) = 2e^{-j\omega T/2}(j \sin(\omega T/2)). \quad (4)$$

Relationship (4) demonstrates the phase relationship of the output signal, $y_n$, of Correction Circuit 71 to its input signal, $x_n'$. In addition to the constant 90° contributed by the j term, the magnitude of $y_n$ varies with frequency because of the $\sin(\omega w T/2)$ term of Relationship (4).

Figure 5A:
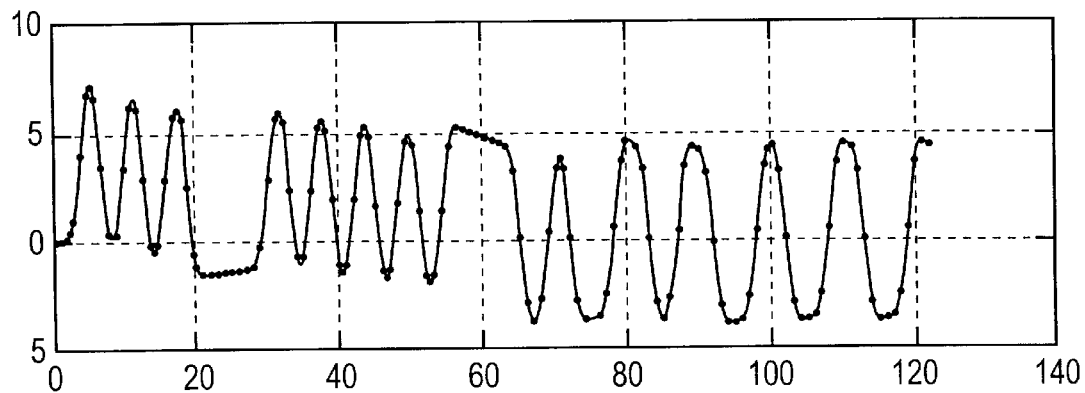
FIG. 5A illustrates hypothetical values for the $x_n$ signal input to Baseline Wander Correction Circuitry.
Figure 5B:
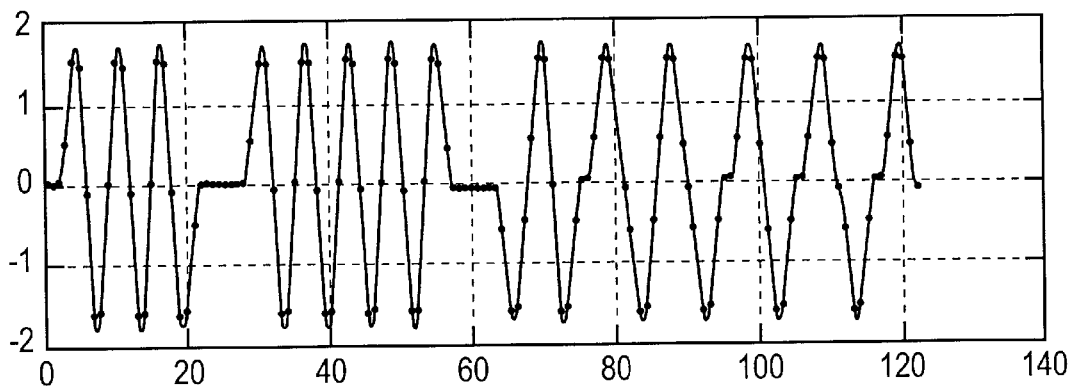
FIG. 5B illustrates hypothetical values for the $y_n$ signal output by Baseline Wander Correction Circuitry in response to the input signal, $x_n$, of FIG. 5A.

FIG. 5A illustrates hypothetical values for the $x_n$ signal input to Baseline Wander Correction Circuitry 48. This hypothetical input signal suffers from baseline wandering—that is to say the average amplitude of the signal is not centered about some constant voltage level, but wanders about because of low frequency disturbances. FIG. 5B illustrates hypothetical values for the $y_n$ signal output by Baseline Wander Correction Circuitry in response to the input signal, $x_n$, of FIG. 5A. Baseline Wander Correction Circuitry 48 has eliminated the baseline wandering of its input from its output, whose average amplitude is constant and centered about 0 volts.

Use of Baseline Wander Correction Circuitry 48 confers an additional benefit upon AGC Circuitry 30 as compared to the same circuit without Baseline Wander Correction Circuitry 48. Baseline Wander Correction Circuitry 48 increases the reliability of DAC 52 by increasing the distance between adjacent sample points. In theory, the distance between adjacent sample points is increased by 33%. This makes it easier to estimate the error, $e_n$, between the actual $y_n$ signal and its ideal, the $\hat{y}_n$ signal and improves the gain control of AGC Circuitry 32.

Figure 6:
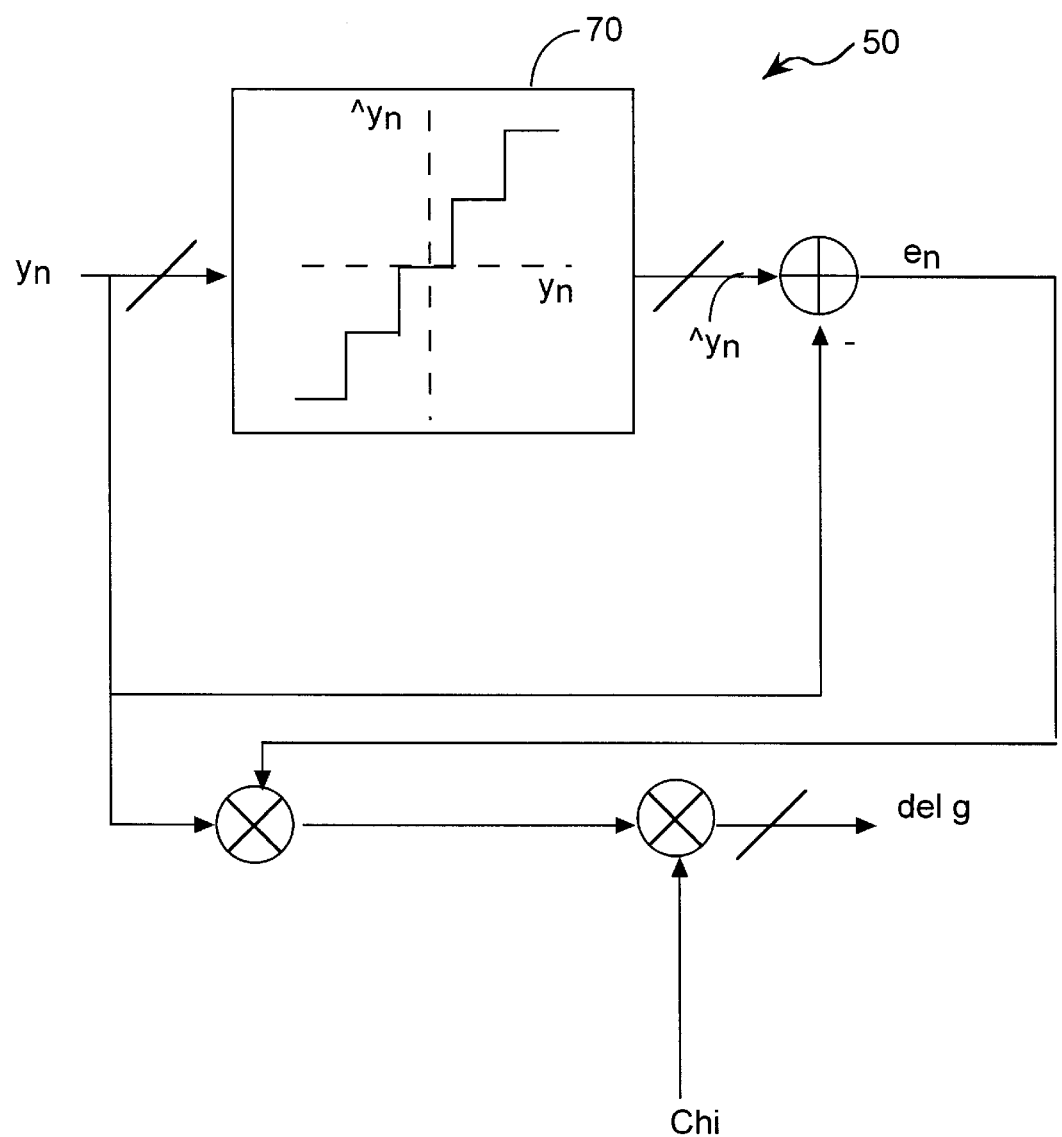
FIG. 6 illustrates a signal flow diagram for the Digital Gain Control Block of the AGC Circuitry of the present invention.

Referring again to FIG. 2, the output from Baseline Wander Correction Circuitry 48, the $y_n$ signal, is coupled to Digital Gain Control Block 50. Digital Gain Control Block 50 uses this signal to determine how the gain of the VGA Amplifier 40 should be adjusted. FIG. 6 illustrates a signal flow diagram for Digital Gain Control Block 50, which produces between its input and output, the del g signal, a relationship of:

$$del\ g = Chi(e_n * y_n); \quad (5)$$

where Chi is the programmed ideal gain, whose value is provided by Digital Video Decoder 24.

As implied previously, $e_n$ can be expressed as:

$$e_n = \hat{y}_n - y_n. \quad (6)$$

Quantizer 70 generates the $\hat{y}_n$ signal from the $y_n$ signal according to the following relationship:

$$\hat{y}_n = q * \text{round}(y_n/q); \quad (7)$$

where q represents a quantization interval; and
"round" represents a rounding function.

Note that Digital Gain Control Block 50 is well known from its use in magnetic disc drive read channels and was not designed to deal with low frequency disturbances, such as baseline wandering. Baseline Wander Correction Circuitry 48 makes use of the Digital Gain Control Block 50 possible by essentially eliminating baseline wandering.

Referring once again to FIG. 2, DAC 52 and capacitor 53 convert the digital gain control signal, del g, into the analog Gain Control Signal input to VGA Amplifier 40 on line 55. Because the effects of baseline wandering have been substantially removed from the feedback path used to generate the Gain Control Signal, AGC Circuitry 32 is more likely to maintain lock than would otherwise be the case.

B. THE CLOCK GENERATOR

Referring again to FIG. 2, AGC Circuitry 32 shares many of its circuits with the Read Channel Clock Generator. The Clock Generator generates the CLK signal, which is used to clock the digital circuits within Read Channel 30 and by Digital Video Decoder 24. Baseline Wander Correction Circuit 48 improves the operation of the Clock Generator by significantly reducing the jitter of the CLK signal. In addition to the circuits which it shares with AGC Circuitry 32, the Clock Generator includes Timing Offset Detector & Digital Loop Filter 80, DAC 82 and VCO 86.

Figure 7:
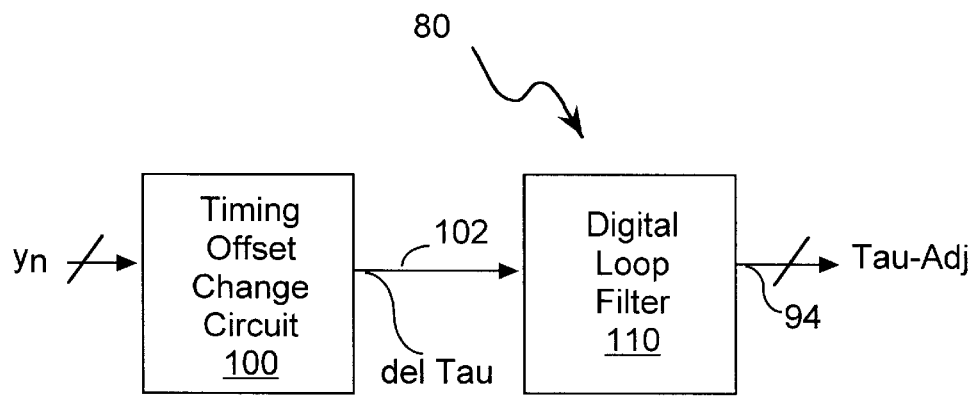
FIG. 7 illustrates, in block diagram form, Timing Offset Detector & Loop Filter of the Read Channel.

Timing Offset Detector & Digital Loop Filter 80 adjusts the phase of the CLK signal based upon the output of the Baseline Wander Correction Circuitry 48, the $y_n$ signal. Timing Offset Detector & Digital Loop Filter 80 outputs the Tau-Adj signal, which represents the desired adjustment to the CLK signal. FIG. 7 illustrates, in block diagram form, Timing Offset Detector & Loop Filter 80, which includes Timing Offset Change Circuit 100 and Digital Loop Filter 110. Timing Offset Change Circuit 100 determines the timing offset between the $y_n$ signal and the ideal $\hat{y}_n$ signal and represents that offset via its output on line 102, the del Tau signal. The relationship between these three signals may be expressed as:

$$del\ Tau = (-y_n * \hat{y}_{n-1}) + (y_{n-1} * \hat{y}_n). \tag{8}$$

Figure 8:
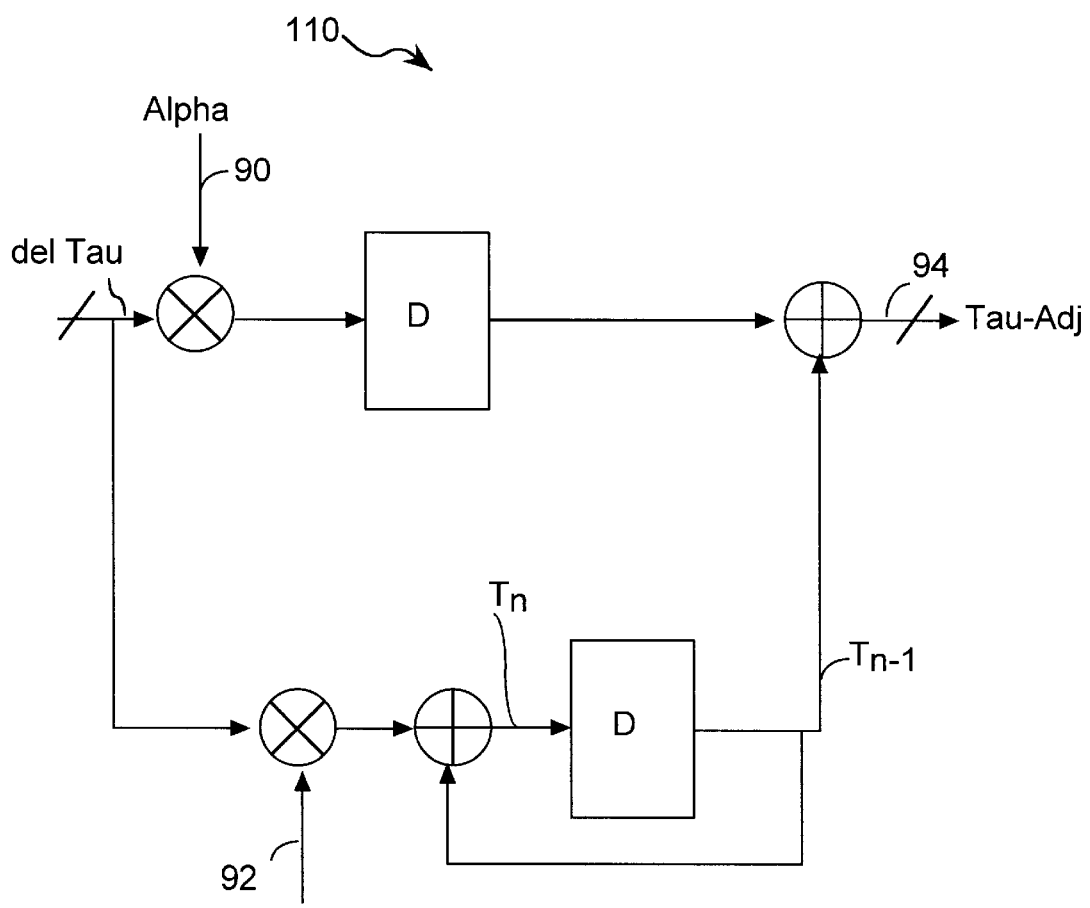
FIG. 8 is a signal flow diagram for Digital Loop Filter of the Timing Offset Detector & Loop Filter of FIG. 7.

Digital Loop Filter 110 takes the timing offset and determines how the clock should be adjusted to more closely align the rising edges of the clock, CLK signal, to the transitions of the DATA signal on line 34. The loop gain constants, Alpha and Beta, are provided by Digital Video Decoder 24. The output from Digital Loop Filter 110, the Tau-Adj signal on line 94, represents the desired adjustment to the CLK signal. FIG. 8 is a signal flow diagram for Digital Loop Filter 110. Note that Digital Loop Filter 110 is well known from its use in magnetic disc drive read channels and was not designed to deal with low frequency disturbances, such as baseline wandering. Baseline Wander Correction Circuitry 48 makes use of the Digital Loop Filter 110 possible by essentially eliminating baseline wandering.

Referring once again to FIG. 2, DAC 82 and capacitor 84 convert the Tau-Adj signal on line 94 into the analog signal input to VCO 86 on line 85. In response, VCO 86 adjusts the phase/frequency of the CLK signal, more closely synchronizing its rising edges to the transitions of the Data signal on line 34.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An automatic gain control circuit (AGC) for an optical Partial Response Maximum Likelihood (PRML) read channel that is insensitive to low frequency disturbances of an RF input signal comprising:

a. a Voltage Gain Amplifier (VGA) for amplifying the RF input signal to produce a second RF signal, a gain of the VGA being controlled by an analog gain control signal;

b. a low pass filter for filtering the second RF signal to produce a first analog signal;

c. an Analog-to-Digital Converter (ADC) for converting the first analog signal into a digital AGC output signal suitable for decoding;

d. a baseline Wander Correction Circuit for removing from the digital AGC output signal effects of low frequency disturbance of the RF input signal to produce a second digital signal;

e. a digital gain control circuit for controlling the gain of the VGA by producing a digital gain control signal in response to the second digital signal; and f. a Digital-to-Analog Converter (DAC) for converting the digital gain control signal into the analog gain control signal, the analog gain control signal being substantially free from effects of low frequency disturbance of the RF input signal.

2. The automatic gain control circuit of claim 1 wherein the baseline Wander Correction Circuit has a transfer function of $H(\omega)=1-D$, where D represents a delay associated with a single sampling interval, T, and $\omega$ represents frequency in radians per second.

3. The automatic gain control circuit of claim 1 wherein the relationship between the digital gain control signal, del-g, and the second digital signal, $y_n$, is given by the relationship:

$$del\text{-}g = e_n * y_n;$$

where $e_n$ represents the difference between $y_n$ and its corresponding ideal value, $\hat{y}n$.

4. The automatic gain control circuit of claim 3 wherein the ideal value, $\hat{y}_n$, corresponding to $y_n$ is given by the relationship:

$$\hat{y}_n = q * \text{round}(y_n/q);$$

where q represents a quantization interval.

5. The automatic gain control circuit of claim 1 wherein the low pass filter has a cut-off frequency of approximately 1/(3T), where T is a sampling interval.

6. The automatic gain control circuit of claim 5 wherein the low pass filter has a boost of approximately 6 dB.

7. An automatic gain control circuit for an optical PRML read channel that is insensitive to low frequency disturbances of an RF input signal comprising:

a. a VGA for amplifying the RF input signal to produce a second RF signal, a gain of the VGA being controlled by an analog gain control signal;

b. a low pass filter for filtering and boosting the second RF signal to produce a first analog signal;

c. an ADC for converting the first analog signal into a digital AGC output signal suitable for decoding;

d. a baseline wander correction circuit for removing from the digital AGC output signal effects of low frequency disturbance of the RF input signal to produce a second digital signal;

e. a digital gain control circuit for controlling the gain of the VGA by producing a digital gain control signal in response to the second digital signal, the digital gain control signal producing a relationship between the digital gain control signal, del-g, and the second digital signal, $y_n$, expressed by:

$$del\text{-}g = e_n * y_n;$$

where $e_n$ represents the difference between $y_n$ and its corresponding ideal value, $\hat{y}n$; and f. a DAC for converting the digital gain signal into the analog gain control signal, the analog gain control signal being substantially free from effects of low frequency disturbance of the RF input signal.

8. The automatic gain control circuit of claim 7 wherein the ideal value, $\hat{y}_n$, corresponding to $y_n$ is given by the relationship:

$$\hat{y}_n = q*\mathrm{round}(y_n/q);$$

where q represents a quantization interval.

9. The automatic gain control circuit of claim 8 wherein the low pass filter has a cut-off frequency of approximately 1/(3T); and wherein the boost of the low pass filter is approximately 6 dB.

10. The automatic gain control circuit of claim 7 wherein the baseline wander correction circuit includes:

a quantizer for reducing noise of the digital AGC output signal, the quantizer having an input and an output, the input of the quantizer being coupled to the digital AGC output signal; and a correction circuit for producing the second digital signal, the correction circuit having an input being coupled to the output of the quantizer, the correction circuit having a transfer function of $H(\omega)=1-D$, where D represents a delay associated with a single sampling interval, T, and $\omega$ represents frequency in radians per second.

11. A method of automatic gain control for an optical Partial Response Maximum Likelihood (PRML) read channel that is insensitive to low frequency disturbances of an RF input signal, the method comprising:

a. amplifying the RF input signal to produce a second RF signal in response to an analog gain control signal;

b. filtering the second RF signal to produce a first analog signal;

c. converting the first analog signal into a digital AGC output signal suitable for decoding;

d. removing from the digital AGC output signal effects of low frequency disturbance of the RF input signal to produce a second digital signal;

e. producing a digital gain control signal in response to the second digital signal; and f. converting the digital gain control signal into the analog gain control signal, the analog gain control signal being substantially free from effects of low frequency disturbance of the RF input signal.

12. The method of claim 11 wherein the effects of low frequency disturbance of the FR input signal are removed using a Baseline Wander Correction Circuit having a transfer function of $H(\omega)=1-D$, where D represents a delay associated with a single sampling interval, T, and $\omega$ represents frequency in radians per second.

13. The method of claim 12 wherein the relationship between the digital gain control signal, del-g, and the second digital signal, $y_n$, is given by the relationship:

$$del\text{-}g = e_n * y_n;$$

where $e_n$ represents the difference between $y_n$ and its corresponding ideal value, $\hat{y}n$.

14. The method of claim 13 wherein the ideal value, $\hat{y}_n$, corresponding to $y_n$ is given by the relationship:

$$\hat{y}_n = q*\mathrm{round}(y_n/q);$$

where q represents a quantization interval.

* * * * *